US008965593B2

(12) United States Patent
Sun

(10) Patent No.: US 8,965,593 B2
(45) Date of Patent: Feb. 24, 2015

(54) HYBRID THREE-PHASE POWER FLOW ANALYSIS METHOD FOR UNGROUNDED DISTRIBUTION SYSTEMS

(75) Inventor: Hongbo Sun, Plymouth, MN (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 548 days.

(21) Appl. No.: 13/366,608

(22) Filed: Feb. 6, 2012

(65) Prior Publication Data

US 2013/0204556 A1    Aug. 8, 2013

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl.
USPC .............................. 700/295; 700/22; 700/286

(58) Field of Classification Search
CPC ...... H02J 3/06; H02J 2003/007; Y02E 60/76; Y04S 40/22
USPC ........ 700/22, 286, 291–298; 702/60–62, 134, 702/182; 703/1–2, 18
See application file for complete search history.

(56) References Cited

U.S. PATENT DOCUMENTS

| | | | |
|---|---|---|---|
| 3,883,724 A * | 5/1975 | Pradhan et al. | 703/3 |
| 5,629,825 A * | 5/1997 | Wallis et al. | 361/64 |
| 6,459,175 B1 * | 10/2002 | Potega | 307/149 |
| 7,002,265 B2 * | 2/2006 | Potega | 307/149 |
| 7,088,090 B2 * | 8/2006 | Staats | 324/126 |
| 7,301,739 B2 * | 11/2007 | Hamer | 361/42 |
| 8,089,323 B2 * | 1/2012 | Tarng et al. | 331/117 FE |
| 8,326,594 B2 * | 12/2012 | Sun | 703/18 |
| 2002/0101231 A1 * | 8/2002 | Staats | 324/126 |
| 2003/0085621 A1 * | 5/2003 | Potega | 307/18 |
| 2004/0158772 A1 * | 8/2004 | Pan et al. | 714/14 |
| 2004/0263149 A1 * | 12/2004 | Staats | 324/126 |
| 2005/0162148 A1 * | 7/2005 | Staats | 324/126 |
| 2007/0081281 A1 * | 4/2007 | Hamer | 361/42 |
| 2007/0090398 A1 * | 4/2007 | McKinzie, III | 257/192 |
| 2009/0066157 A1 * | 3/2009 | Tarng et al. | 307/31 |
| 2011/0004357 A1 * | 1/2011 | Mathiowetz | 700/295 |
| 2012/0150497 A1 * | 6/2012 | Sun | 703/2 |
| 2013/0285739 A1 * | 10/2013 | Blaquiere et al. | 327/565 |
| 2014/0236503 A1 * | 8/2014 | Sun | 702/59 |
| 2014/0236507 A1 * | 8/2014 | Sun | 702/61 |

* cited by examiner

*Primary Examiner* — Ramesh Patel
(74) *Attorney, Agent, or Firm* — Dirk Brinkman; Gene Vinokur

(57) ABSTRACT

A method for a three phase power flow analysis of an ungrounded power distribution system partitions a topology of the power distribution system into a mainline system and a set of tap systems, wherein the mainline system is formed by mainline buses connecting a swing bus and a set of constant active power and voltage magnitude (PV) buses, wherein the tap system is formed by one or many tap buses, such that a root bus of each tap system corresponds to a mainline bus. Next, the method determines voltages of the mainline buses based on a function of a total load of each tap system; and determines voltages of tap buses based on a voltage of the corresponding root bus of the mainline and load of each tap bus.

17 Claims, 9 Drawing Sheets

900

HYBRID THREE-PHASE POWER FLOW ANALYSIS METHOD FOR UNGROUNDED DISTRIBUTION SYSTEMS

FIELD OF THE INVENTION

This invention relates generally to power distribution systems, and more particularly to three-phase power flow analysis for ungrounded power distribution systems.

BACKGROUND OF THE INVENTION

The function of power distribution systems is delivering the electric powers from the transmission systems to the customers. The distribution system may be either a 3-phase 4 wire system, or a 3-phase 3 wire system. The power from transmission system or distribution generators are delivered to the customers through transmission lines, and various voltage regulating devices, such as voltage regulators, two-winding or three-winding transformers. The customer loads may be of single phase, or three-phase. The loads may be constant power load, constant current load or constant impedance load.

FIG. 1 shows schematic diagrams of a sample distribution system including both the three-phase representation 101 and one-line diagram 102. The sample system includes one Delta-connected three-phase source 110, two three-phase transmission lines 120 and 140, one Delta-connected three-phase load 150, and one two-winding transformer 130 with Wye/Delta connection. There are four three-phase buses in the system, including bus 115, bus 125, bus 135 and bus 145. This sample distribution system is an ungrounded distribution system.

The purpose of three-phase power flow analysis is to obtain the voltages at each phase of any bus in the distribution system, for specified source and load conditions. After the voltages are known, currents and powers in each branch on each phase, as well as the output of the generation sources, can be determined analytically.

The ungrounded distribution system is a special case of distribution system. It adopts three phase three wire configuration. The windings of transformers or voltage regulators use Delta, ungrounded Wye, or open Delta connection. Delta or open Delta connections are commonly used for the distribution loads or shunt capacitors. The effectiveness of power flow methods are heavily depended on what type of devices is modeled, and how the device is connected in itself and with other ones.

Depending on known parameters, buses of the distribution system can be classified as (1) a swing bus, if the voltage magnitude |V| and the phase angle $\theta$ are known; (2) as a PQ bus, if the active power P and the reactive power Q are known; and (3) as a PV bus, the active power P and voltage magnitude |V| are known. The bus type is determined by the known parameters of connected sources and loads.

Various methods for solving three phase power flow problem are known. Those methods differ in either the form of the equation describing the system, or the numerical techniques used, and usually are either topology based or matrix based. Typical topology based methods include backward/forward sweep method, and ladder method. Typical matrix based methods include implicit Z-bus matrix method, Newton-Raphson method, and Fast Decoupled method. All of those methods have their own limitations when applied to large systems either in modeling capabilities or computational efficiency.

SUMMARY OF THE INVENTION

The objective of various embodiments of invention is providing a fast and accurate method for power flow analysis suitable for large-scale ungrounded distribution systems. The embodiments of the invention are based on a realization that partitioning the power distribution system according to its topology simplifies specific analysis of each type of system. This is because such partitioning can take advantage of matrix based methods for handling the multiple PV buses, and the computation efficiency provided by topology based method for radial systems. Thus, such partitioning and recursive analysis allows increasing efficiency of the power flow analysis.

Based on topology connectivity analysis, the distribution system is partitioned into a mainline system and tap systems, and the mainline and tap systems are analyzed recursively by, e.g., nodal admittance matrix based Newton method, and topology based backward/forward sweep respectively. The method has made full use of the strong capability provided by the matrix based methods for handling the multiple PV buses, and the computation efficiency provided by topology based method for radial systems. During the partitioning, the three-winding transformers are split into three two-winding transformers to be considered.

In some embodiments, impacts of zero-impedance branches such as voltage regulators have been modeled by merging those branches with adjacent impedance branches, and the inaccuracy or divergence problem introduced by adding small impedance into those branches that used by conventional methods have been avoided. Unlike common practice to set active power for each phase arbitrarily, the method models the control requirements for three-phase PV buses with balanced voltages precisely, that is maintaining the sum of three phase active power constant, and maintaining three phase voltages balanced and with constant magnitudes. Besides the improvement of accuracy, the method also further reduce the admittance matrix by merging three phases of PV buses into one phase, and removing one of zero-impedance branch buses from the model.

Instead of setting the bus initial voltages with swing bus values, and initializing loop compensation currents as zeros, some embodiments initialize the bus voltages and loop compensation currents appropriately and, thus, further reduce the number of iterations for converged voltage and loop compensation solutions. For example, the initial loop compensation currents can be based on the connected loop loads and an allocation factor matrix defined solely by the loop path impedances. The initial bus voltages can be set based on amplifier factors of transformers and regulators along paths connecting each bus with the swing bus.

Some embodiments use an analytic formula to uniquely convert line-to-line voltages into phase-to-ground voltages for ungrounded buses. By using the formula, the ungrounded transformers in tap systems are solved by using the line-to-line voltage based admittance models to avoid the resulting matrix singularity if using phase-to-ground voltage based ones. The formula also enables constructing the nodal admittance matrix for the mainline system based on the line-to-line voltage based amplifying factor matrix of zero-impedance branches. The tap solution process is further simplified by integrating the line charging into connected buses, and only the series line currents are used during the iterations.

Accordingly, various embodiments of the invention disclose a hybrid three phase power flow method analyzing ungrounded power distribution systems by partitioning the systems into a mainline system and tap systems. The mainline system includes paths connecting swing bus and PV buses, in some embodiments the mainline system is simplified by merging of zero-impedance branches into adjacent impedances and bundling three phases of PV buses with balanced source voltages into single phase. The active and reactive power equations may be formulated in polar coordinates and solved by Newton method with constant Jacobian matrix with sparse matrix decomposition algorithm.

A tap system is fed by one of mainline buses and serving all loads downstream to the bus, and may be solved by Backward/forward sweep with compensation method. The loops of tap systems may be broken into radial paths and the allocation matrix based on impedances of the loop may be used to initially allocate the downstream currents between parallel loop paths.

In some embodiments, the conversion of line-to-line voltages into phase-to-ground voltages may be applied to use line-to-line voltage based regulator and transformer parameters to build mainline admittance matrix and simplifying the computation of tap system solution. The initial voltages may be determined based on amplifier factors of transformers and regulators along paths connecting each bus with the swing bus. The mainline and tap systems are iteratively solved, until maximum voltage mismatch between two consecutive iterations are less than a predetermined threshold.

Accordingly, one embodiment discloses a method for a three phase power flow analysis of an ungrounded power distribution system, including partitioning a topology of the power distribution system into a mainline system and a set of tap systems, wherein the mainline system is formed by mainline buses connecting a swing bus and a set of constant active power and voltage magnitude (PV) buses, wherein the tap system is formed by one or many tap buses, such that a root bus of each tap system corresponds to a mainline bus; determining voltages of the mainline buses based on a function of a total load of each tap system; and determining voltages of tap buses based on a voltage of the corresponding root bus of the mainline and load of each tap bus, wherein steps of the method are performed by a processor.

Another embodiment discloses a system for a three phase power flow analysis of an ungrounded power distribution system. The system includes a processor for partitioning a topology of the power distribution system into a mainline system and a set of tap systems, and for determining voltages of each bus of the power distribution system recursively until a convergence criteria is satisfied, wherein each iteration updates total loads of tap systems and voltages of root buses of the mainline system.

DETAILED DESCRIPTION OF THE PREFERRED EMBODIMENTS

Mainline and Tap Systems

Figure 1:
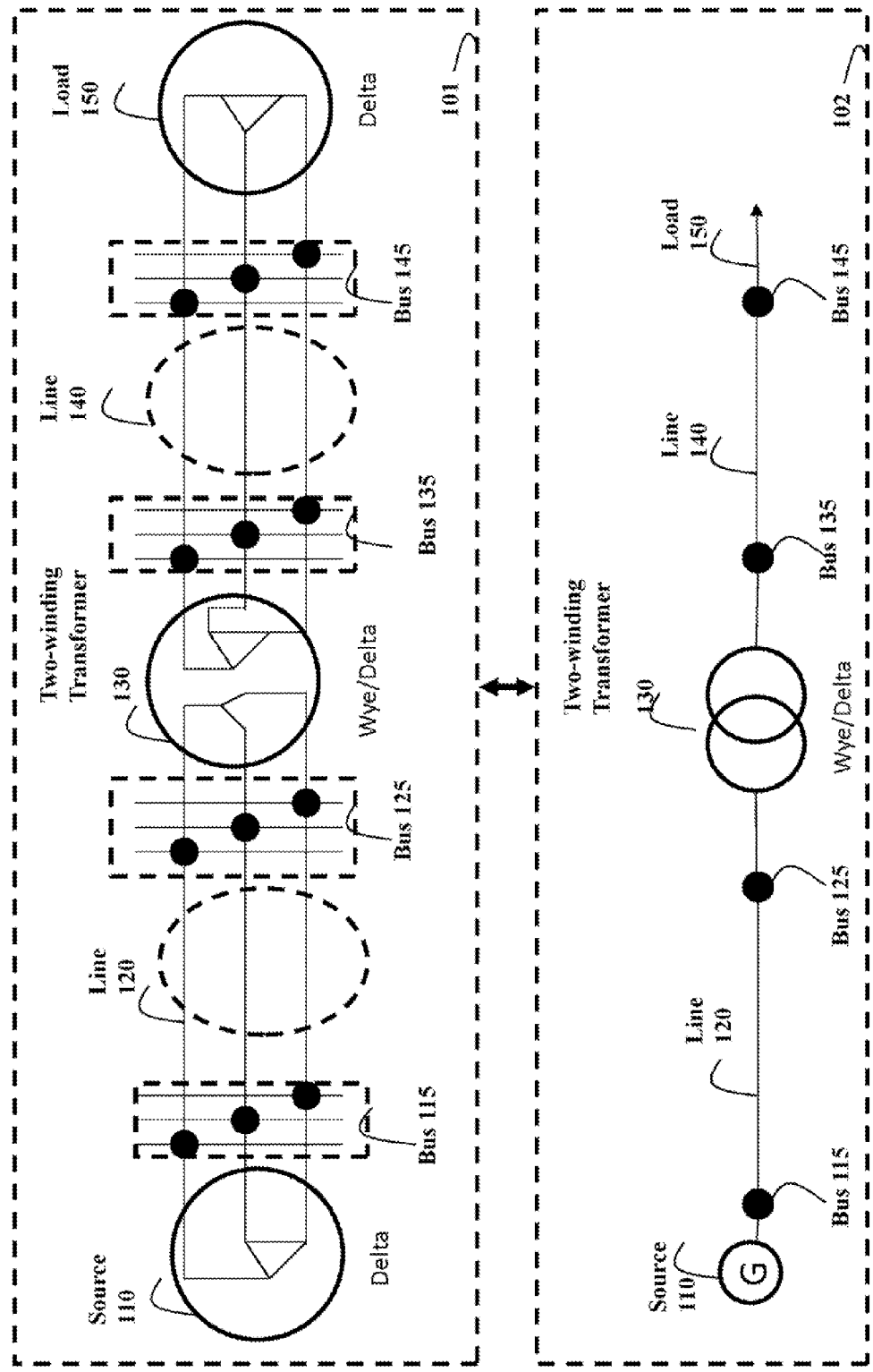
FIG. 1 is an example of a conventional three-phase ungrounded distribution system.
Figure 2:
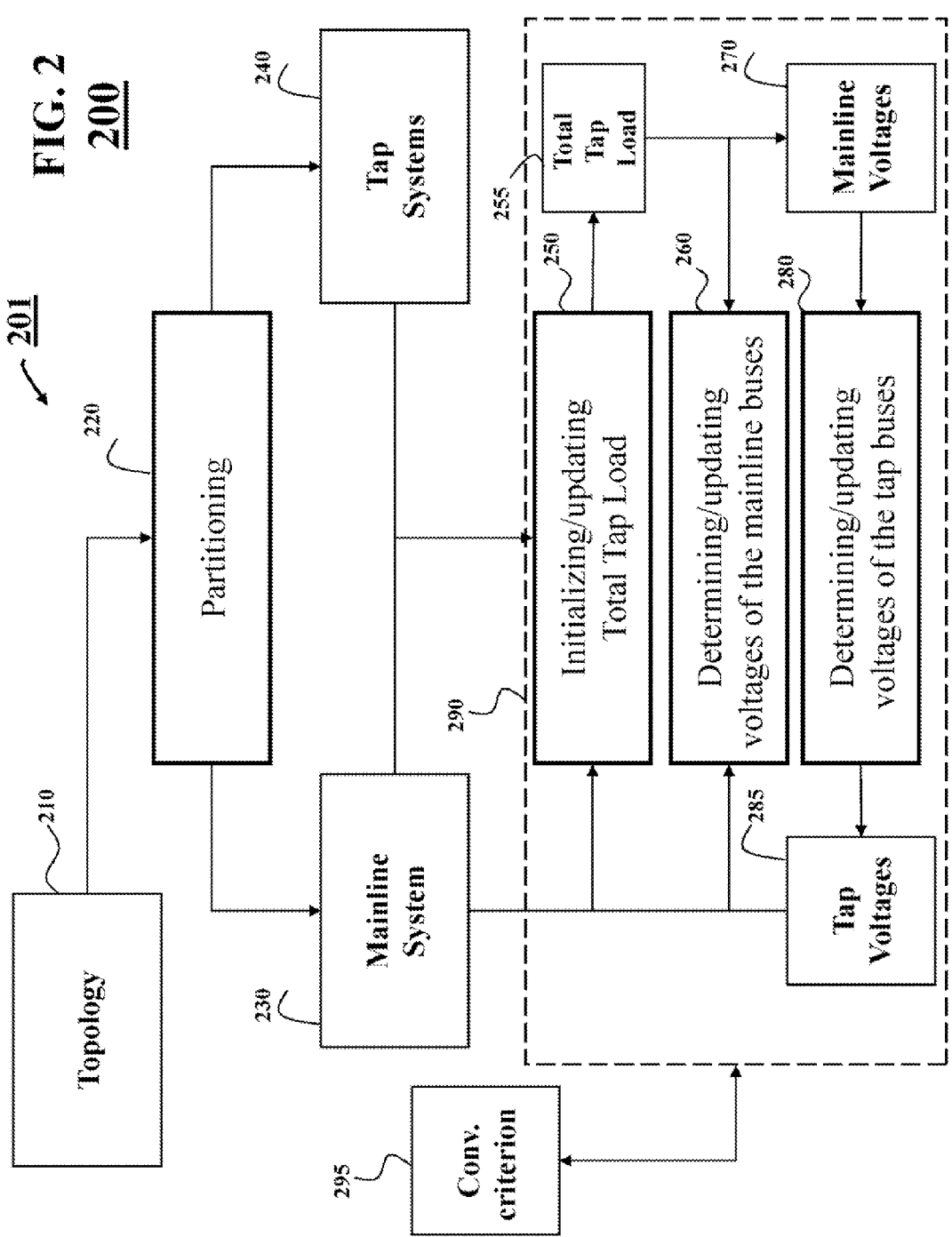
FIG. 2 is a block diagram of a method for three-phase load flow analysis according to some embodiments of invention.

FIG. 2 shows a block diagram of a method 200 for a three phase power flow analysis of a power distribution system, such as an ungrounded power distribution system. Based on topology connectivity analysis 210, the power distribution system is partitioned 220 into a mainline system 230 and a set of tap systems 240. The mainline and the tap systems are analyzed recursively 290 according to various embodiments of the invention. For example, voltages of the mainline buses 270 are determined 260 based on total tap loads 255 of the tap systems. The total tap load can be initialized 250, e.g., based on a voltage of a swing bus and the topology of power distribution system. Then, using the mainline voltages 270, voltages of tap buses 285 are determined 280 based on a voltage of the corresponding root bus of the mainline. The method 200 can be executed by a processor 201. The topology 210 of the system can be predetermined and stored into a memory.

Due to the dependence of loads on voltages, voltages of the mainline system and the tap systems are determined recursively 290 until a convergence criterion 295 is satisfied. For example, in one embodiment iteration includes updating 260 the voltages of mainline buses based on the total tap load and, e.g., nodal admittance matrices of the mainline buses; updating 280 the voltages of tap buses based on the voltage of the corresponding root bus of the mainline; and updating 250 the total tap load based the voltages of the tap buses of the corresponding tap systems.

Various embodiments of the invention are based on a realization that partitioning the power distribution system according to its topology simplifies specific analysis of each type of system. This is because such partitioning can take advantage of matrix based methods for handling the multiple PV buses, and the computation efficiency provided by topology based method for radial systems. Thus, such partitioning and recursive analysis allows increasing efficiency of the power flow analysis.

For example, one embodiment of the invention determines the total load of each tap system based on a backward sweep to produce a set of current total loads, and updates the voltages of the mainline buses based on the set of current total loads and the admittance matrices of the mainline buses to produce the current voltages of the mainline buses. Next, the embodiment updates the voltages of the tap buses based on the current voltages of the mainline buses using a forward sweep, as described in more details below.

Figure 3:
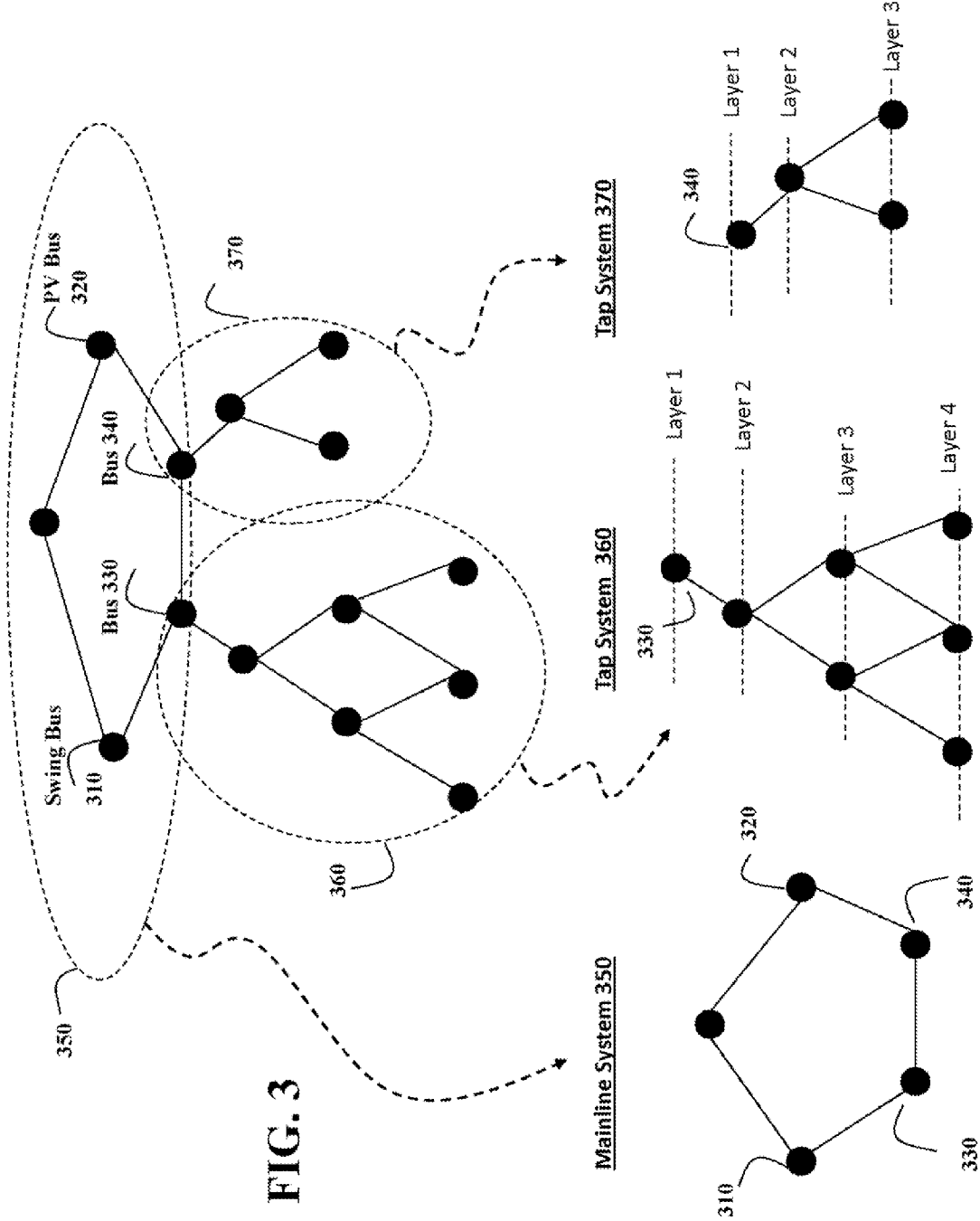
FIG. 3 is an example of partitioning a distribution system into one mainline system, and multiple tap systems according to some embodiments of the invention.

FIG. 3 shows an example of partitioning the power distribution system into a corresponding mainline system 350, and two tap systems 360 and 370. As used herein, the mainline system is formed by mainline buses connecting a swing bus and a set of constant active power and voltage magnitude (PV) buses, and the tap system is formed by one or many tap buses, such that a root bus of each tap system corresponds to a mainline bus In the example, the mainline system 350 includes six buses, including one swing bus 310, one PV bus 320, and two root buses, 330 and 340 for two tap systems, 360 and 370. The buses of the exemplar mainline system 350 form a loop. A tap system 360 starts from a mainline bus 330, which is its root bus, and includes all buses and devices downstream to the bus 330. As can be seen, the tap system 360 also forms a loop. A tap system 370 starts from a corresponding root bus 340 of the mainline system, and includes all buses and devices downstream to the bus 340. The tap system 370 has no loops and is a radial system.

Based on the number of device connected between the study bus and the root, the tap systems can be divided into layers. For example, the tap system 360 can divided into four layers, the first layer contains one bus, and the last layer constants 3 buses. Similarly, the tap system 370 can be divided into 3 layers. Some embodiments use the layers of the tap system in the forward/backward sweep analysis.

Some embodiments of the invention are based on another realization that a model of the power distribution system can be transformed into an equivalent model suitable for the power flow analysis according to various embodiments of the invention. For example, some embodiments update the topology by representing a set of three-winding transformers as a set of two-winding transformers, transform a loop of the topology of the tap system formed by a subset of tap buses into radial paths, or merge a zero-impedance mainline branch and an adjacent impedance mainline branch into an new impedance branch. These embodiments further increase efficiency and accuracy of the power flow analysis.

Also, some embodiments of the invention are based on yet another realization that a nodal admittance matrix for an impedance branch connected to a three phase PV bus should be determined based on a model of a single phase bus, because the PV bus is connected to a balanced voltage source and the regulated parameters are the voltage magnitude of balanced voltages and the total active power of three phases. Accordingly, some embodiments determine a phase of the single phase bus as corresponding to a sum of three phases of the PV bus, and update the voltages of mainline buses is based on the nodal admittance matrix.

Furthermore, instead of setting the bus initial voltages with swing bus values, and initializing compensation currents as zeros, some embodiments initialize the loop compensation currents based on the connected loop loads and an allocation factor matrix defined solely by the loop path impedances, and set the initial bus voltages based on amplifier factors of transformers and regulators along paths connecting each bus with the swing bus. These embodiments increase the convergence of the recursion during the power flow analysis.

Additionally or alternatively, some embodiments use an analytic formula to uniquely convert line-to-line voltages into phase-to-ground voltages for ungrounded buses. By using the analytic formula, the ungrounded transformers in tap systems are analyzed by using the line-to-line voltages based admittance models to avoid the resulting matrix singularity if using phase-to-ground voltage based ones. The formula also enables constructing the nodal admittance matrix for the mainline system based on the line-to-line voltage based amplifying factor matrix of zero-impedance branches. The tap solution process is further simplified by integrating the line charging into connected buses, and only the series line currents are used during the iterations.

Three Winding Transformers

Some embodiments of the invention represents three-winding transformers as three integrated two winding transformers to facilitate applying two-terminal based connectivity analysis method to the partitioning of distribution systems. Those two-winding transformers are modeled separately, and may reside in different systems. The two-winding connections can be determined based on the three-winding connection. For example, for a three winding transformer connected with $W_p/W_s/W_t$, $W_p$, $W_s$ and $W_t$ are the corresponding connection type for its primary winding, secondary winding and tertiary winding, the connections of three two-winding transformers are set as $W_p/W_p$, $W_p/W_s$, and $W_p/W_t$ respectively.

Figure 4:
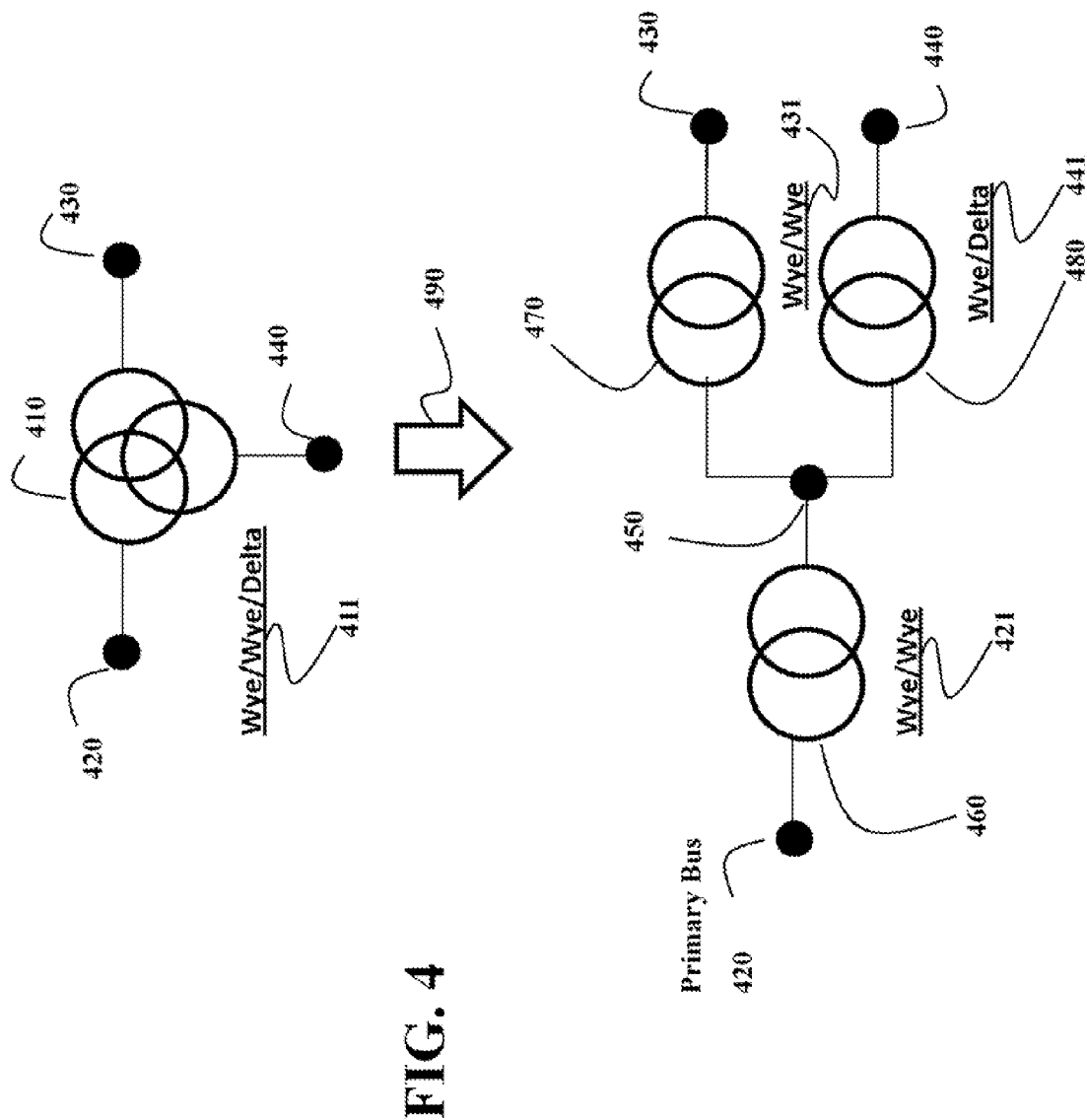
FIG. 4 is an example of splitting a three-winding three-phase transformer into three integrated two-winding three-phase transformers according to some embodiments of the invention.

FIG. 4 shows an example of three-winding transformer 410 transforming into three two-winding transformers 460, 470 and 480. The connection type for the three-winding transformer in this example is Wye/Wye/Delta 411. The transformer 410 is connected with three buses, including a primary bus 420, a secondary bus 430, and a tertiary bus 440. During the transformation 490, the three-winding transformer is replaced with three two-winding transformers and a new bus, neutral bus 450, is added. The winding connection type is set as Wye/Wye 421 for the transformer 460 between the primary bus 420 and the neutral bus 450, Wye/Wye 431 for the transformer 470 between the neutral bus 450 and the secondary bus 430, and Wye/Delta 441 for the transformer 480 between neutral bus 450 and tertiary bus 440. Other variations are also possible.

The tap positions for the primary, secondary and tertiary sides are kept the settings given by the three-winding. The tap positions of neutral sides are set as 0. The transformer impedances for each two-windings are calculated based on the transformer impedances between primary, secondary and tertiary sides for three-winding one:

$$\begin{bmatrix} z_{pn} \\ z_{sn} \\ z_{tn} \end{bmatrix} = \frac{1}{2} \begin{bmatrix} 1 & 1 & -1 \\ 1 & -1 & 1 \\ -1 & 1 & 1 \end{bmatrix} \begin{bmatrix} z_{ps} \\ z_{pt} \\ z_{st} \end{bmatrix} \quad (1)$$

$Z_{pn}$, $Z_{sn}$ and $Z_{tn}$ are the equivalent impedance for transformer between primary and neutral, secondary and neutral, and tertiary and neutral. $Z_{ps}$, $Z_{pt}$ and $Z_{st}$ are the given impedance parameters between primary, secondary and tertiary sides.

Loops

In some embodiments, the mainline system is analyzed using a nodal admittance matrix based method, so the loops can be directly model in the method. However, the tap systems are analyzed using a backward/forward sweep method that is designed for radial systems. Accordingly, some embodiments of the invention break loops into a model of the radial paths, as described below. The downstream load current fed by the loop is allocated appropriately in order to make the voltages at breakpoints identical.

Figure 5:
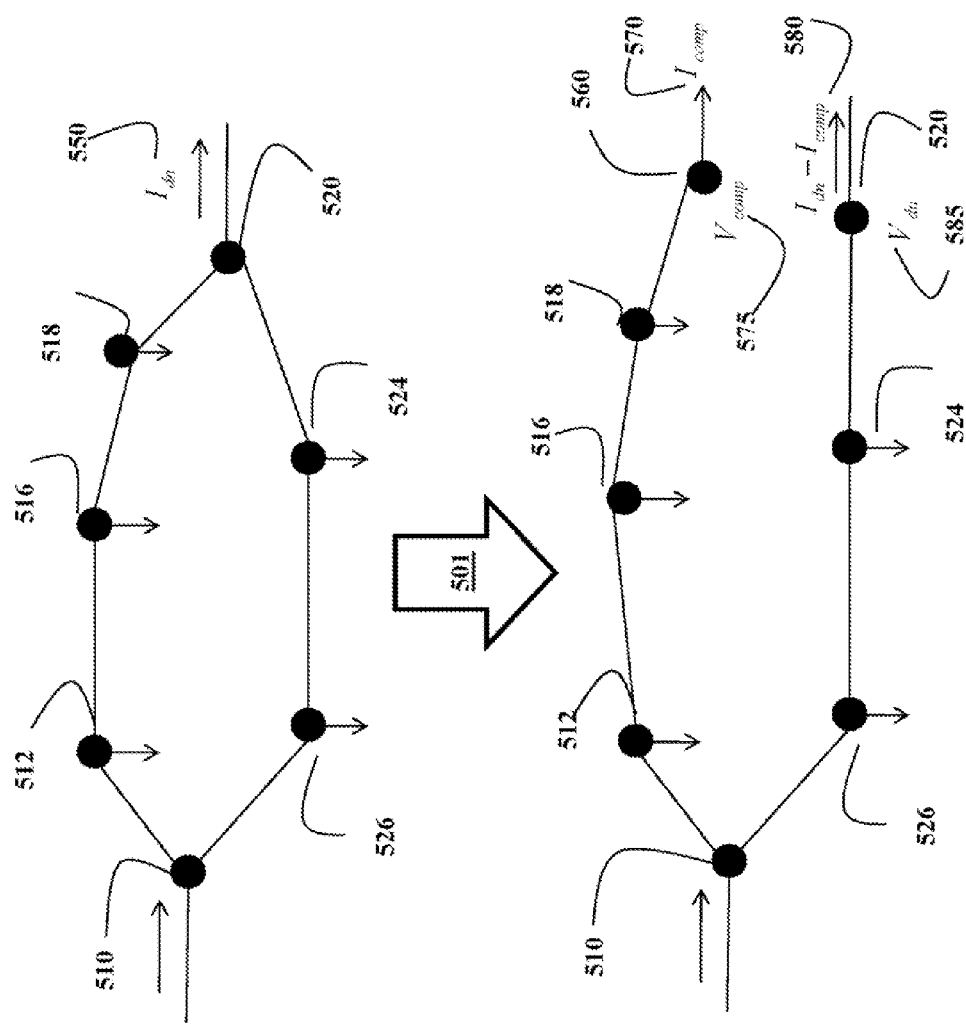
FIG. 5 is an example of breaking a loop of tap systems into two separate radial paths of tap systems according to some embodiments of the invention.

FIG. 5 shows an example construction of an equivalent model for a tap system having a loop formed between an upstream and downstream intersection buses, e.g., a bus 510 and a bus 520. The upstream or downstream is relative term defined by, e.g., the distance to the swing bus. For example, a bus that is closer to the swing bus is the upstream bus, and a bus that is further from the swing bus is referred as a downstream bus. There are two paths available from the bus 510 to the bus 520. One path is through buses 512, 516, and 518, and the other one is through buses 526, and 524. A load current at the bus 520 is $I_{dn}$ 550.

One embodiment models 501 the loop by replacing the downstream intersection bus with two breakpoints, i.e., one is the original bus 520, and the other is a new compensation bus 560. Compensation current. $I_{comp}$ 570 is added as a load to the compensation bus 560, and as a negative load to the original bus 520. The load current 580 of the bus 520 has been set as the original load current $I_{dn}$ 550 minus the compensation current $I_{comp}$ 570.

The vector of compensation current $I_{comp}$ at phases a, b and c, can be determined according to $$I_{comp} = A_{comp} I_{dn} \quad (2)$$

wherein a vector $I_{dn}$ includes the currents fed through the downstream intersection bus 520, and an allocation factor matrix $A_{comp}$ is used to allocate downstream currents between two parallel loop paths. The allocation factor matrix is calculated based on the series impedance matrices of two paths according to $$A_{comp} = Z_{up\text{-}dn} + Z_{up\text{-}dn} + Z_{up\text{-}comp})^{-1} \quad (3)$$

wherein $Z_{up\text{-}dn}$ is the impedance matrices for the path between the upstream bus 510 to the downstream bus 520, and $Z_{up\text{-}comp}$ is the impedance matrices for the path between the upstream bus 510 to the compensation bus 570.

When constructing the path impedance matrices, the shunt admittance of a line section is ignored, a transformer or voltage regulator is treated as zero impedance, only the series impedances are used. The path impedance matrices are 3 by 3 matrix if the devices along the paths are all three phase ones.

The allocation factor matrix is used to initially allocate the loads at downstream bus into two parallel paths. One embodiment adjusts the currents at the two paths when the voltages at two breakpoints do not match each other. The incremental compensation currents, $\Delta I_{comp}$ can be determined according to $$\Delta I_{comp} = Z_{comp}^{-1} \Delta V_{comp} \quad (4)$$

wherein a vector $\Delta V_{comp}$ is the voltage difference between the compensation bus and the loop downstream intersection bus;

$$\Delta V_{comp} = (V_{comp} - V_{dn}) \quad (5)$$

wherein $V_{comp}$ 575 and $V_{dn}$ 585 are the phase-to-ground voltages at the bus 560, and the bus 520, respectively, $Z_{comp}$ is a loop impedance matrix, which for an independent loop can be determined as the sum of two path impedance matrices according to $$Z_{comp} = (Z_{up\text{-}dn} + Z_{up\text{-}comp}) \quad (6)$$

If some of loops share common paths between different loops, the Equation (4) still can be applied. In this case, the vector $\Delta I_{comp}$ and $\Delta V_{comp}$ includes the corresponding compensation current and voltage changes for each loop. The loop impedance matrices $Z_{comp}$ are formed based the path impedance matrix for each loop, and common path impedance between loops. The diagonal sub matrix is equal to the sum of the branch impedance for all branches in the loop, and the off-diagonal sub matrix is non-zero only if two loop share one or more common branches. The signs of the off-diagonal sub matrices depended on the relative direction of the compensation currents for two loops.

Distribution Lines

The relationship of branch currents and bus voltages for an impedance branch between a bus p and a bus s can be described as follows:

$$\begin{bmatrix} I_{ps} \\ I_{sp} \end{bmatrix} = \begin{bmatrix} Y_{pp} & Y_{ps} \\ Y_{sp} & Y_{ss} \end{bmatrix} \begin{bmatrix} V_p \\ V_s \end{bmatrix} \quad (7)$$

wherein $I_{ps}$ and $I_{sp}$ are the vectors of phase currents flowing through the bus p, and the bus s into the branch respectively. $V_p$ and $V_s$ are the vectors of phase voltages at bus p and bus S, $Y_{pp}$ and $Y_{ss}$ are self admittance matrix at the bus p, and the bus s, and $Y_{ps}$ and $Y_{sp}$ are mutual admittance matrices between the bus p and the bus s, and the bus s and the bus p, respectively. The dimension of those vectors and matrices can be determined by the available phases on the branch and two terminal buses. For example, for a three-phase branch, all branch currents and bus voltages can be 3 by 1 vectors, and the self and the mutual admittance matrices can be 3 by 3 matrices. The Equation (7) can be used for any impedance devices in the mainline or tap systems.

Figure 6:
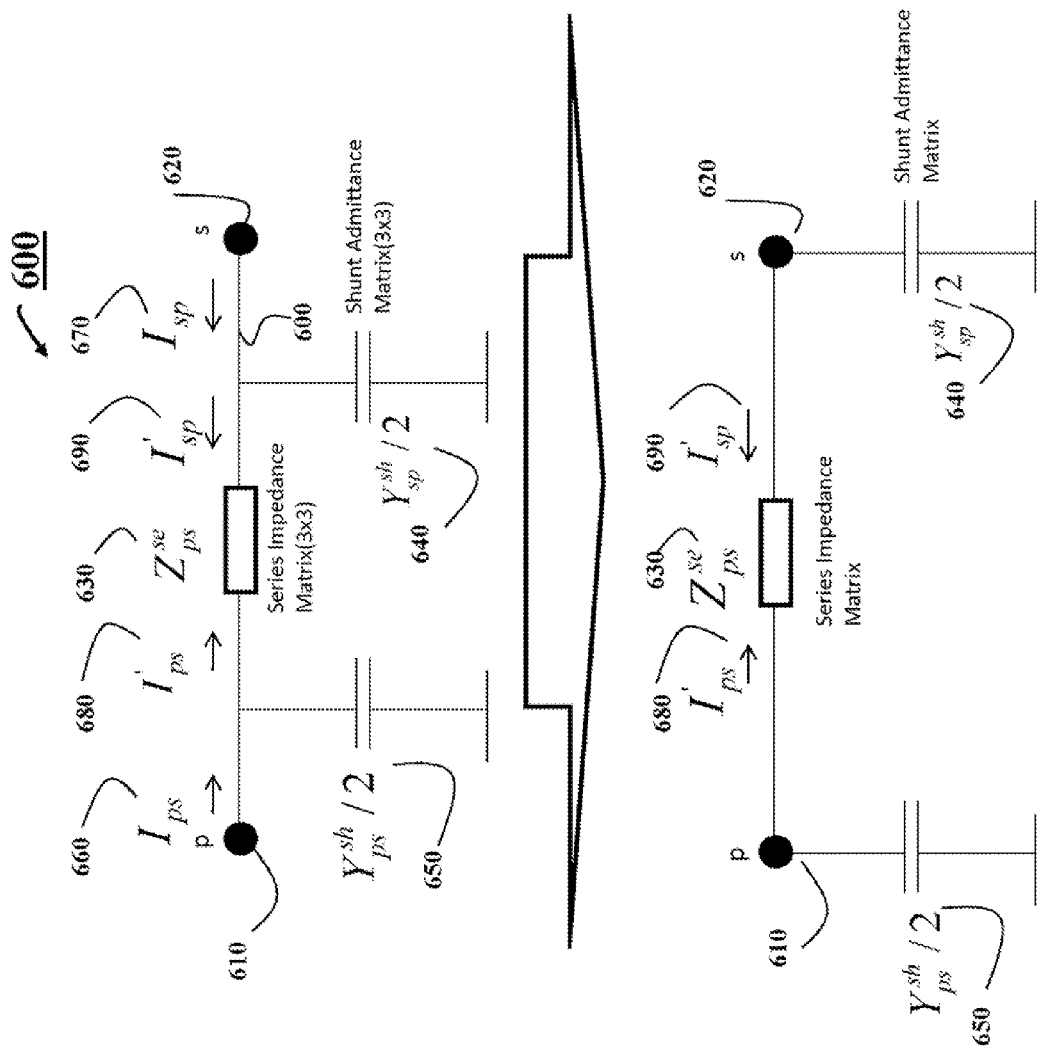
FIG. 6 is an example of merging line charging of a line of a tap system into adjacent buses to simplify line model as a solely series impedance model according to some embodiments of the invention.

FIG. 6 shows a distribution line 600 connecting a bus p 610 and a bus 620. A three-phase overhead and underground lines for underground systems has three wires, and can be described by a 3 by 3 series impedance matrix and a 3 by 3 shunt admittance matrix. For example, FIG. 6 shows a conventional π-model of a distribution line in which one series impedance matrix $Z_{ps}^{se}$ 630 is applied to the series branch, and one shunt admittance matrix $Y_{ps}^{sh}$ is split into two shunt branches, 640 and 650. The π-model of the distribution lines can be replaced with a series impedance branch by merging the line charging of shunt admittances into terminal buses. For example, the internal currents, $I'_{ps}$ 680 and $I'_{sp}$ 690 that directly flowing through the series impedances 630 can replace actual branch currents, $I_{ps}$ 660 and $I_{sp}$ 670, as the variables of the model to be solved. The actual branch currents can be determined by adding the line charging currents to the internal currents after the converged power flow solutions are obtained.

For a line in the mainline system, the admittance model can be described using Equation (7), in which the self admittance matrices are equal to the line series admittance $Y_{ps}^{se}$, $Y_{pp} = Y_{ss} = Y_{ps}^{se}$, mutual admittances are equal to the negative of series admittance matrix, $Y_{ps} = Y_{sp} = -Y_{ps}^{se}$, and the series admittance is the inverse of series impedance matrix, $Y_{ps}^{se} = Z_{ps}^{se^{-1}}$.

For a line in a tap system, the backward/forward sweeps can be described as follows. For a backward sweep procedure, $I'_{sp}$ and $V_s$ are known, and $I'_{ps}$ is determined according to $$I_{ps}^{x'} = -I_{sp}^{x} \, x \in \{a, b, c\} \quad (8)$$

wherein $I_{ps}^{x'}$ and $I_{sp}^{x'}$ are the branch currents entering from bus p and bus s on phase x, which can be one of the available phases a, b or c.

For a forward sweep procedure, the branch currents $I'_{ps}$ and the bus voltages $V_p$ at sending side are known, the bus voltages at a receiving side $V_s$ are determined according to $$V_s = V_p - Z_{ps}^{se} I'_{ps} \quad (9)$$

Zero-Impedance Branches

Some branches in a power distribution system can be regarded as zero-impedance branches, such as step voltage regulators, switches, ideal transformers, very short lines and jumpers. Usually, conventional methods ignore the impedances of those branches and set the impedances to zero. However, the consequence is that some entries in the resultant nodal admittance matrix are infinite, and thus the admittance matrix based approaches are inapplicable. In order to use admittance matrix based approaches, conventional methods have arbitrarily assigned small non-zero impedances to those branches. However, assigning such small impedances makes the analysis ill-conditioned, and power flows are difficult to converge.

Accordingly, some embodiments of the invention merge zero-impedance branches with adjacent impedance branches to model as new non-zero impedance branches.

Figure 7:
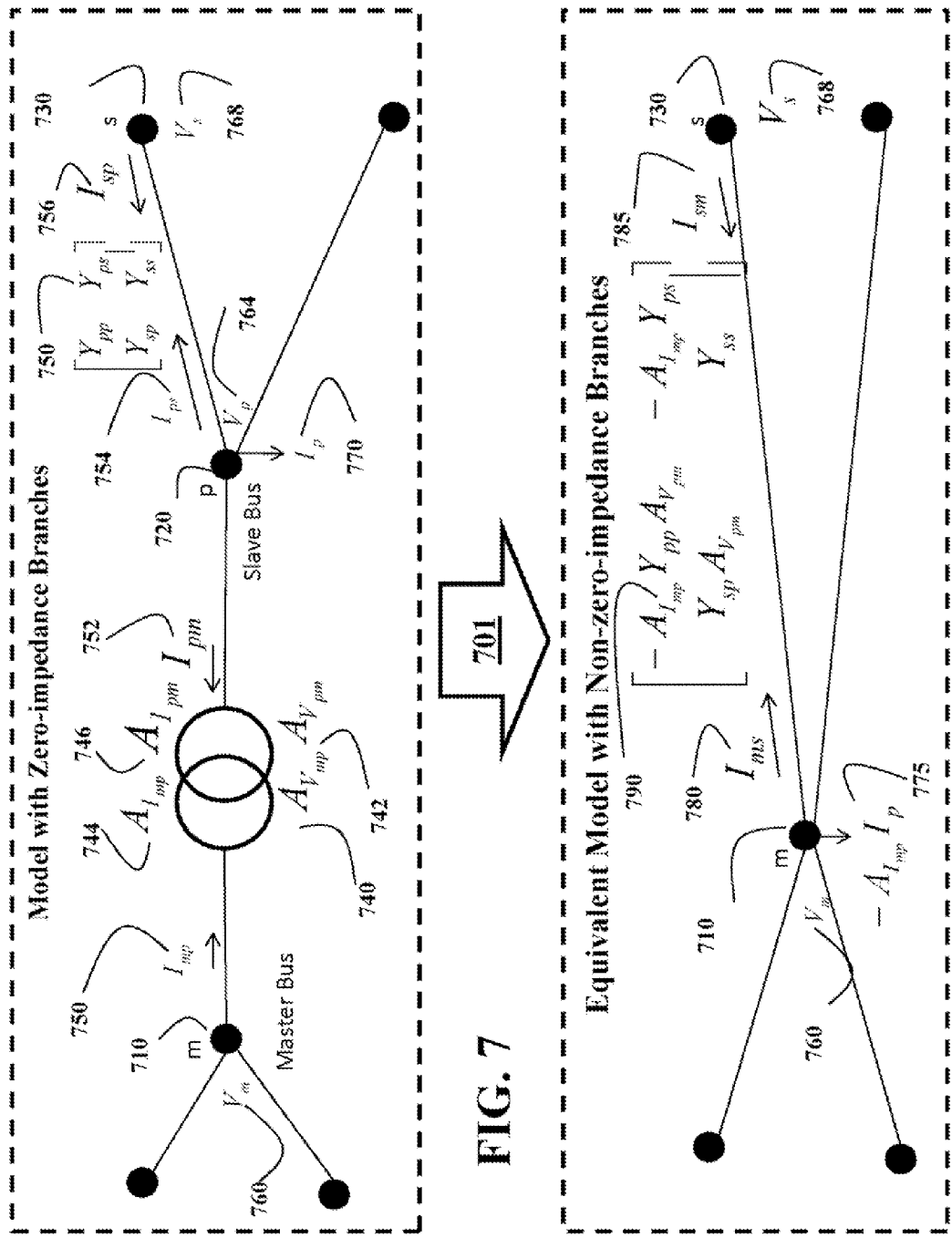
FIG. 7 is an example of transforming a mainline system with three-phase zero impedance branches to an equivalent model of mainline system with non-zero impedance branches according to some embodiments of the invention.

FIG. 7 shows an example of determining 701 an equivalent distribution system with only non-zero impedances branches, by merging a zero-impedance mainline branch and adjacent impedance mainline branches into new impedance branches and set their nodal admittance matrices based on the admittance matrices of the adjacent branches and the amplifying factor matrices of the zero-impedance branch. For example, the branch between bus m 710 and bus p 720 represents a generalized three-phase zero-impedance branch. One of the buses, for example the bus 710 is assigned to be a master bus, and the other bus is assigned as slave bus. The buses are connected by an ideal transformer. The slave bus is connected with a load current $I_p$ 770. The transformer's functionality is represented by two voltage amplifying factor matrices, $A_{V_{mp}}$ 740 and $A_{V_{pm}}$ 742, and two current amplifying factor matrices, $A_{I_{mp}}$ 744 and $A_{I_{pm}}$ 746. Those amplifying factor matrices are determined by the winding connection and tap positions for a transformer or a voltage regulator; and by the phase connection for a switch, a short line or a jumper.

The phase currents entering through the master bus m 710, $I_{mp}$ 750 can be determined by multiplying the phase currents entering through slave bus $I_{pm}$ 752 with amplifying factor matrix $A_{I_{mp}}$ 744 according to $$I_{mp} = A_{I_{mp}} I_{pm} \quad (10)$$

Reversely, the phase currents entering through the slave bus p 720, $I_{pm}$ 752 can be determined by multiplying the phase currents entering through master bus $I_{mp}$ 750 with amplifying factor matrix $A_{I_{pm}}$ 746 according to $$I_{pm} = A_{I_{pm}} I_{mp} \quad (11)$$

The phase-to-ground voltages at the master bus m 710, $V_m$ 760 can be determined by multiplying the phase-to-ground voltages at slave bus p 720, $V_p$ 764 with amplifying factor matrix $A_{V_{mp}}$ 740 according to $$V_m = A_{V_{mp}} V_p \quad (12).$$

and the voltages at the slave bus p 720, $V_p$ 764 can be determined by multiplying the voltages at master bus m 710, $V_m$ 760 with amplifying factor matrix $A_{V_{pm}}$ 742 according to $$V_p = A_{V_{pm}} V_m \quad (13)$$

For ungrounded voltage regulators and transformers, the voltage amplifying factor matrices can be defined by line-to-line voltages, $A_{V_{mp}}^{LL}$ and $A_{V_{pm}}^{LL}$. The line-to-line voltages at the master and slave bus, $V_m^{LL}$ and $V_p^{LL}$ can be determined according to $$V_m^{LL} = A_{V_{mp}}^{LL} V_p^{LL} \quad (14)$$

$$V_p^{LL} = A_{V_{pm}}^{LL} V_m^{LL} \quad (15)$$

For a zero-impedance branch in a tap system, assuming the master bus in is the sending bus, the slave bus p is the receiving bus, the Equation (10) can be used to calculate the sending side currents for the backward sweep step, and Equations (13) or (15) can be used to calculate the voltages of the receiving side for the forward sweep step.

Some embodiments of the invention are based on a fact that the above equations use phase-to-ground voltages or line-to-line voltages. Accordingly, some embodiments convert between two different types of voltages. For any bus p, the phase-to-ground voltages, $V_p$ can be uniquely converted into line-to-line voltages, $V_p^{LL}$ using a voltage conversion factor matrix $C_V^{LP}$ according to $$V_p^{LL} = C_V^{LP} V_p \quad (16)$$

$$C_V^{LP} = \begin{bmatrix} 1 & -1 & 0 \\ 0 & 1 & -1 \\ -1 & 0 & 1 \end{bmatrix} \quad (17)$$

Vector $V_p^{LL}$ is a 3 by 1 vector, and includes voltages between phases a to b, phases b to c, and phases c to a, i.e., $V_p^{ab}, V_p^{bc}$ and $V_p^{ca}$, respectively. Vector $V_p$ is also a 3 by 1 vector, and includes voltages at phase a, b and c, $V_p^a, V_p^b$ and $V_p^c$ respectively.

The conversion from line-to-line voltages into phase-to-ground voltages is not trivial. Due to unknown of neutral to ground voltages, multiple results may be obtained based on the same line-to-line voltages. A conversion equation described in this disclosure, uniquely converts the line-to-line voltages to the phase-to-ground voltages. The conversion equation is accurate when the voltages only include positive and negative sequence components; and is a good approximation if the zero-sequence components are small enough.

The phase-to-ground voltages $V_p$ can be determined by multiplying the line-to-line voltages $V_p^{LL}$ with a conversion matrix $C_V^{PL}$ according to $$V_p = C_V^{PL} V_p^{LL} \quad (18)$$

$$C_V^{PL} = \begin{bmatrix} 1/3 & 0 & -1/3 \\ -1/3 & 1/3 & 0 \\ 0 & -1/3 & 1/3 \end{bmatrix} \quad (19)$$

As shown in FIG. 7, a zero-impedance branch in a mainline system is merged into adjacent impedance branches, such that the slave bus is not considered in analysis of the model. In example of FIG. 7, the zero-impedance branch is connected to two branches by the slave bus 720, and to another two branches by the master bus 710. Taking one adjacent branch between slave bus p 720 and bus s 730 as example, the relationship between the branch currents, and bus voltages for the branch can be described by Equation (7), 750. In the equivalent model, the zero-impedance branch and the slave bus p 720 are removed. There are no changes for the branches connected to the master bus m 710. The branches connected to the slave bus p 720 are reconnected to bus in 710, and the branch admittance matrices and the current injections at the master bus in 710 are modified accordingly.

The load current $I_p$ 770 at bus p 720 are modeled as equivalent currents at bus m 710, as $-A_{I_{mp}} I_p$ 775. The branch between the bus p 720 and the bus s 730 in the system is replaced with a new branch directly between the bus m 710 and the bus s 730, and the branch currents, $I_{ms}$ 780, $I_{sm}$ 785 and nodal voltages, $V_m$ 760 and $V_s$ 768 are related as $$\begin{bmatrix} I_{ms} \\ I_{sm} \end{bmatrix} = \begin{bmatrix} -A_{I_{mp}} Y_{pp} A_{V_{pm}} & -A_{I_{mp}} Y_{ps} \\ Y_{sp} A_{V_{pm}} & Y_{ss} \end{bmatrix} \begin{bmatrix} V_m \\ V_s \end{bmatrix} \quad (20)$$

The self admittance at the bus in 710 is determined from the negative product of current amplifying matrix $AI_{mp}$ 744, self admittance at the bus p, and voltage amplifying matrix $A_{V_{pm}}$ 742. The mutual admittance for bus m 710 to bus s 730 is the negative product of current amplifying matrix, $A_{I_{mp}}$ 744 and mutual admittance for bus p 720 to bus s 730. The mutual admittance for bus s 730 to bus m 710 is the product of mutual admittance for bus s to bus p and voltage amplifying matrix $A_{V_{pm}}$ 742.

If the amplifying matrices are expressed with line-to-line voltages, Equation (20) is replaced by the following equation (21):

$$\begin{bmatrix} I_{ms} \\ I_{sm} \end{bmatrix} = \begin{bmatrix} -A_{I_{mp}} Y_{pp} C_V^{PL} C_V^{LP} & -A_{I_{mp}} Y_{ps} \\ Y_{sp} C_V^{PL} A_{V_{pm}}^{LL} C_V^{LP} & Y_{ss} \end{bmatrix} \begin{bmatrix} V_m \\ V_s \end{bmatrix} \quad (21)$$

The voltage conversion factor matrices defined in Equation (17) and Equation (19) are used in Equation (21) to deduce the phase-to-ground voltage based matrices from line-to-line voltage based ones.

Three-Phase PV Buses with Balanced Voltages

Figure 8:
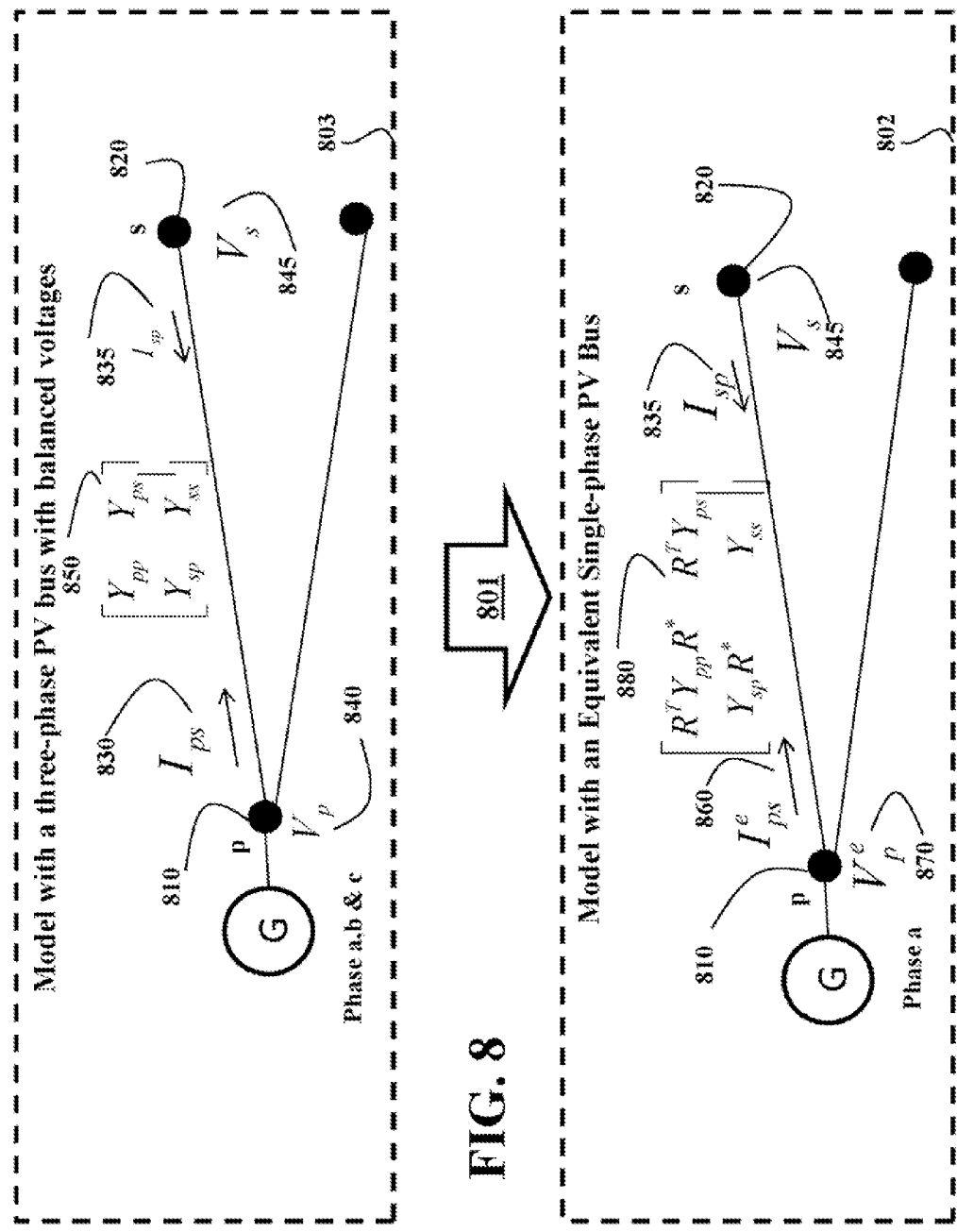
FIG. 8 is an example of transforming the mainline system with three-phase balanced voltage PV bus into to an equivalent model of a mainline system with an equivalent single-phase PV bus according to some embodiments of the invention.

FIG. 8 shows an example of determining 801 an equivalent model 802 for a model 803 of the power distribution system with three-phase ganged regulated PV buses. A PV bus in the mainline system can be modeled as three PV nodes if power and voltage magnitude of each phase is regulated independently. However, in various embodiments, a PV bus is connected to a balanced voltage source and the regulated parameters are the voltage magnitude of balanced voltages and the total active power of three phases. Accordingly, some embodiments merge the three-phase bus into one single phase bus to be modeled in admittance matrix based power flow equations.

For example, one embodiment transforms a model of a distribution system with three phase PV buses to an equivalent distribution system model with equivalent single-phase PV buses. The total power generation $S_p$ of a three phase PV bus p 810 can be determined as the summation of phase powers for all phases, and for any phase x, the phase power at the phase is the product of phase to ground voltage $V_p^x$ and the conjugate of phase current $I_p^{x*}$. Thus, the total power generation $S_p$ can be determined according to $$S_p = \sum_{x \in \{a,b,c\}} V_p^x I_p^{x*} \quad (22)$$

In one embodiment, the three phases a, b, and c are combined as an equivalent single-phase e. The equivalent phase e can be any phase. Taken phase a as an example, the phase voltage for the equivalent phase, v; can be set as the same as the selected phase:

$$V_p^e = V_p^a \quad (23)$$

The current at the equivalent phase e, $I_p^a$ can be calculated as the summation of all three phase currents after rotated to the selected phase, e.g., currents at the phase b and at the phase c are rotated 120 degree, and –120 degree respectively, before adding them to the current of the phase a. The equivalent current is calculated by multiplying the three phase current vector, $I_p$ with a transpose of rotation vector R according to $$I_p^e = R^T I_p \quad (24)$$

Both vectors $I_p$ and R are 3 by 1 vectors. The rotation vector is used to represent the rotation factor required for each phase. Taken phase a as the equivalent phase, the rotation vector is defined as:

$$R = \begin{bmatrix} 1 \\ e^{j120°} \\ e^{-j120°} \end{bmatrix} \quad (25)$$

The total power of three phases at bus p can be replaced with the power at equivalent phase:

$$S_p = V_p^e I_p^{e*} \quad (26)$$

The nodal admittance model for each branch connected with the three-phase PV bus needs to be modified accordingly. In the FIG. 8, the three phase PV bus p 810 is connected to two branches. Taking one branch between bus p 810 and bus s 820 as example, $I_{ps}$ 830 and $I_{sp}$ 835 are the vectors of phase currents flowing through the bus p, and the bus s into the branch respectively. The relationship between the phase currents and phase voltages is described by Equation (7), 850, $Y_{pp}$ and $Y_{ss}$ are self admittance matrix at the bus p, and the bus s, and $Y_{ps}$ and $Y_{sp}$ are mutual admittance matrices between the bus p and the bus s, and the bus s and the bus p, respectively.

In the equivalent model, the three phases of PV buses with balanced voltages are combined into one single phase, and the new branch model can be described as:

$$\begin{bmatrix} I_{ps}^e \\ I_{sp} \end{bmatrix} = \begin{bmatrix} R^T Y_{pp} R^* & R^T Y_{ps} \\ Y_{sp} R^* & Y_{ss} \end{bmatrix} \begin{bmatrix} V_p^e \\ V_s \end{bmatrix} \quad (27)$$

wherein $I_{ps}^e$ 860 is the vector of equivalent current entering through bus p, and $V_p^e$ 870 is the vector of phase voltage of bus p on the selected phase e, $I_{ps}^e$ and $V_p^e$ are 1 by 1 vectors, and $I_{sp}$ 835 and $V_s$ 845 are 3 by 1 vectors. The admittance matrix 880 of the equivalent branch is a 4 by 4 matrix. The self admittance at the bus p 810 is determined from the product of transposed rotation vector, self admittance of the branch at bus p 810, and the conjugate of rotation vector. The mutual admittance for the bus p 810 to the bus s 820 is the product of transposed rotation vector and mutual admittance for bus p 810 to the bus s 820. The mutual admittance for the bus s 820 to the bus p 810 is the product of the mutual admittance for the bus s 820 to the bus p 810 and the conjugate of rotation vector.

Two Winding Transformers

Some embodiments of the invention determine the relationship between the relevant currents and voltages at primary and secondary side for a transformer using Equation (7). In the Equation (7), $I_{ps}$ and $I_{sp}$ are 3 by 1 vectors to represent the three-phase currents at primary and secondary sides, and $V_p$ and $V_s$ are 3 by 1 vectors to represent the phase to ground voltages at primary and secondary sides. The admittance matrix is a 6 by 6 matrix, and can be divided into four 3 by 3 blocks, including primary and secondary self admittance matrices $Y_{pp}$ and $Y_{ss}$, and mutual admittances between primary and secondary sides, $Y_{ps}$ and $Y_{sp}$.

The admittances are determined based on the transformer impedances and its tap positions. The phase-to-ground voltages are used in Equation (7). This equation is good fit for modeling a transformer in the mainline system, but not well suitable for tap systems. For tap system, backward/forward sweep steps need to calculate the inverse of admittance matrices, and unfortunately for ungrounded connections, some of those matrices are singular. So, the line-to-line voltages, and phase currents are used to express the transformer model in tap systems. Because the primary and secondary buses are ungrounded, the sum of three phase currents are zero, so only two phase currents are needed. And only two of three line-to-line voltages are needed as well. As an example, taken currents at phase a and b as current variables, and line-to-line voltage between phase a to phase b, and phase b to phase c as voltage variables, the transformer model can described as follows:

$$\begin{bmatrix} I'_{ps} \\ I'_{sp} \end{bmatrix} = \begin{bmatrix} Y^{LL}_{pp} & Y^{LL}_{ps} \\ Y^{LL}_{sp} & Y^{LL}_{ss} \end{bmatrix} \begin{bmatrix} V^{LL'}_{p} \\ V^{LL'}_{s} \end{bmatrix} \quad (28)$$

wherein $I'_{ps}$ and $I'_{sp}$ are 2 by 1 vectors representing the currents of phase a and phase b at primary and secondary sides, and $V_p^{LL'}$ and $V_s^{LL'}$ are 2 by 1 vectors representing the line-to-line voltages between phase a to phase b, and phase b to phase c at primary and secondary sides. The admittance matrix is a 4 by 4 matrix, and is divided into four 2 by 2 blocks, including primary and secondary self admittance matrices, and mutual admittances between primary and secondary sides.

In one embodiment, the line-to-line voltage based matrices represented in Equation (28) are converted from the phase-to-ground voltage based matrices by multiplying the phase-to-ground based matrices with the voltage conversion factor matrix $C_V^{PL'}$ defined in Equation (30):

$$Y^{LL}_{mn} = Y_{mn} C_V^{PL'} \, m, n \in \{p, s\} \quad (29)$$

$$C_V^{PL'} = \begin{bmatrix} 2/3 & 1/3 \\ -1/3 & 1/3 \\ -1/3 & -2/3 \end{bmatrix} \quad (30)$$

The voltage conversion factor matrix $C_V^{PL'}$ can be used to determine the three phase-to-ground voltages if two line-to-line voltages between phase a to phase b, phase b to phase c are known.

For a transformer of the tap system, Equation (28) can be used for the backward and forward sweep calculations. In the backward sweep procedure, $I'_{sp}$ and $V_s^{LL'}$ are known, while $I'_{ps}$ are determined according to $$I'_{ps} = Y^{LL}_{pp} Y^{LL^{-1}}_{sp} (I'_{sp} - Y^{LL}_{ss} V^{LL'}_s) + Y^{LL}_{ps} V^{LL'}_s \quad (31)$$

In forward sweep procedure, $I'_{sp}$ and $V_p^{LL'}$ are known, while $V_s^{LL'}$ is determined according to $$V^{LL'}_s = Y^{LL^{-1}}_{ss} (I'_{sp} - Y^{LL}_{sp} V^{LL'}_p) \quad (32)$$

Example of Analyzing Tap Systems

The current summation based backward/forward sweep scheme with loop breakpoint compensation is applied. The scheme includes two integrated steps. One is the backward sweep step, or current summation step, which calculates the branch currents starting from the branches at last layers and moving towards the branches connected to the root bus. The other is forward sweep step, or voltage update step which updates the branch terminal voltages starting from the branches in the first layer towards those in the last. For each branch between sending bus p and receiving bus s, the voltage at receiving bus s is calculated using the updated voltages at sending bus p.

In a backward sweep, for any branch between sending bus p and receiving bus s, the branch current entering the receiving bus s is determined according to $$I^x_{sp} = -I^x_s - \sum_{t \in DN_s} I^x_{st}, x \in \{a, b, c\} \quad (33)$$

wherein $I_s^x$ is the equivalent current for bus s at phase x; $DN_s$ is a set of downstream buses connected to the bus s, $I_{st}^x$ is the phase current entering through bus s into a branch between bus s and bus t. The branch current entering through the sending bus can be determined using Equation (8) for a line, and Equation (31) for a transformer, and Equation (10) for a zero-impedance branch.

The equivalent phase currents for a bus contributes from the connected loads, capacitors, the line charging from connected lines, and the loop compensation currents, if it is a loop breakpoint. The loads and capacitors are Delta connected in an ungrounded system. The loads include constant power loads, constant current loads, and constant impedance loads. The equivalent phase currents at bus p can be determined according to $$I_p = C_I^{PL} I_p^{LL} - \frac{1}{2} \sum_s (Y^{sh}_{ps} V_p) + I^{comp} \quad (34)$$

The first component of the right side of Equation (34) is the contribution from connected loads and capacitors which are calculated as line-to-line currents, $I_p^{LL}$ and then converted to phase currents using the current conversion factor matrix $C_I^{PL}$ defined as:

$$C_I^{PL} = \begin{bmatrix} 1 & 0 & -1 \\ -1 & 1 & 0 \\ 0 & -1 & 1 \end{bmatrix}. \quad (35)$$

The second component of the right side of Equation (34) is the contribution of line charging for all lines that connected to bus p, and $Y_{ps}^{sh}$ is the shunt admittance of line between bus p and s. The third component, $I^{comp}$, is the contribution of loop compensation currents that can be determined using Equation (2) and Equation (4) if bus p is one of loop breakpoints.

The line-to-line current at bus p between phase x and y is determined as follows:

$$I_p^{xy} = \frac{PS_p^{xy-R} - jQS_p^{xy-R}}{V_p^{xy*}} + \frac{(PI_p^{xy-R} - jQI_p^{xy-R})|V_p^{xy}|}{|V_p^{xy-R}| V_p^{xy*}} + \frac{(PZ_p^{xy-R} - jQZ_p^{xy-R})|V_p^{xy}|^2}{|V_p^{xy-R}|^2 V_p^{xy*}} + \frac{jCAP_p^{xy-R}|V_p^{xy}|^2}{|V_p^{xy-R}|^2 V_p^{xy*}} xy \in \{ab, bc, ca\} \quad (36)$$

$PS_p^{xy-R}$, $QS_p^{xy-R}$ are the rated active and reactive power of constant power loads at bus p and between phase x to phase y; $PI_p^{xy-R}$, $QI_p^{xy-R}$ the rated active and reactive power of constant current loads; $PZ_p^{xy-R}$, $QZ_p^{xy-R}$ the rated active and reactive power of constant impedance loads; $CAP_p^{xy-R}$ is the rated reactive power generated at bus p and phase x to y; and $V_p^{xy-R}$ is the rated voltage at bus p and between phase x to y.

In a forward sweep, the line-to-line voltages are used for calculation of transformers and voltage regulators, and then converted into phase-to-ground voltages by using the voltage conversion factors. The phase-to-ground voltages are used for calculation of lines, and converted into line-to-line voltages if the connected device is a transformer or voltage regulator. The Equation (9) is used for lines, Equation (32) for transformers, and Equation (13) for zero-impedance devices.

Example of Analyzing Mainline System

The modeled bus and phases in the mainline system are converted to nodes to construct the power flow equations, according to some embodiments of the invention. The number of nodes for each bus is equal to the number of modeled or available phase at the bus. The power flow equations are formulated in polar coordinates and solved by Newton method with constant Jacobian matrix.

Any bus in the mainline system, which is not a PV, or swing bus, is treated as a PQ bus. Its equivalent phase powers are determined by the connected loads, capacitors, adjacent line charging and downstream branches if it is a root bus for a tap system. The equivalent power $s_i$ for bus p at phase x is determined according to $$S_p^x = V_p^x \left( I_p^x + \sum_{s \in Tap_p} I_{ps}^x \right)^* x \in \{a, b, c\} \quad (37)$$

wherein $I_p^x$ is the equivalent phase current that can be determined using Equation (34) and the loop compensation currents are set as zero. $Tap_p$ is the set of buses that connected with the bus p and resided in the tap system fed by the bus p.

The power flow equations are $$P_i = |V_i| \sum_j |V_j|[G_{ij}\cos(\theta_i - \theta_j) + B_{ij}\sin(\theta_i - \theta_j)] \quad (38)$$

$$Q_i = |V_i| \sum_j |V_j|[G_{ij}\sin(\theta_i - \theta_j) - B_{ij}\cos(\theta_i - \theta_j)] \quad (39)$$

where, $P_i$ and $Q_i$ are the net injected active power and reactive power at node i, $|V_i|$ and $\theta_i$ are the voltage magnitude and phase angle at node i, and $G_{ij}$ and $B_{ij}$ are the real and imaginary part of nodal admittance element associated with node i and node j.

Application of the Taylor expansion to Equations (38) and (39) produces $$\begin{bmatrix} \Delta P \\ \Delta Q \end{bmatrix} = [J] \begin{bmatrix} \Delta \theta \\ \Delta |V| \end{bmatrix}, \quad (40)$$

where $\Delta P$ and $\Delta Q$ are vectors of nodal power mismatches between the scheduled values and calculated values, $\Delta \theta$ and $\Delta |V|$ are the vectors of node phase angle and voltage magnitude changes, J are the Jacobian matrices of node active and reactive powers with respect to node phase angles and node voltage magnitudes.

The Jacobian matrix is factorized, e.g., by using sparse LU decomposition or sparse Cholesky decomposition techniques. The Jocobian matrix is determined by the initial voltage setting. In one embodiment, the Equation (40) is solved iteratively, until the active and reactive mismatches are small than given maximum tolerance.

The initial voltages are set as the values at swing bus multiplying with aggregated voltage amplifying factor matrix introduced by the transformers or voltage regulators along shortest path between the swing bus and the bus:

$$V_p^{(0)} = \prod_{st} A_{V_{st}} V_{swing} \quad (41)$$

wherein $V_p^{(0)}$ is the vector of initial voltages of bus p, $V_{swing}$ is the voltage of the swing bus, $A_{V_{st}}$ is the voltage amplifying factor matrix of a regulator or transformer between two of buses, bus s and bus t residing on the shortest path from the swing bus to the bus under the consideration.

Example

Figure 9:
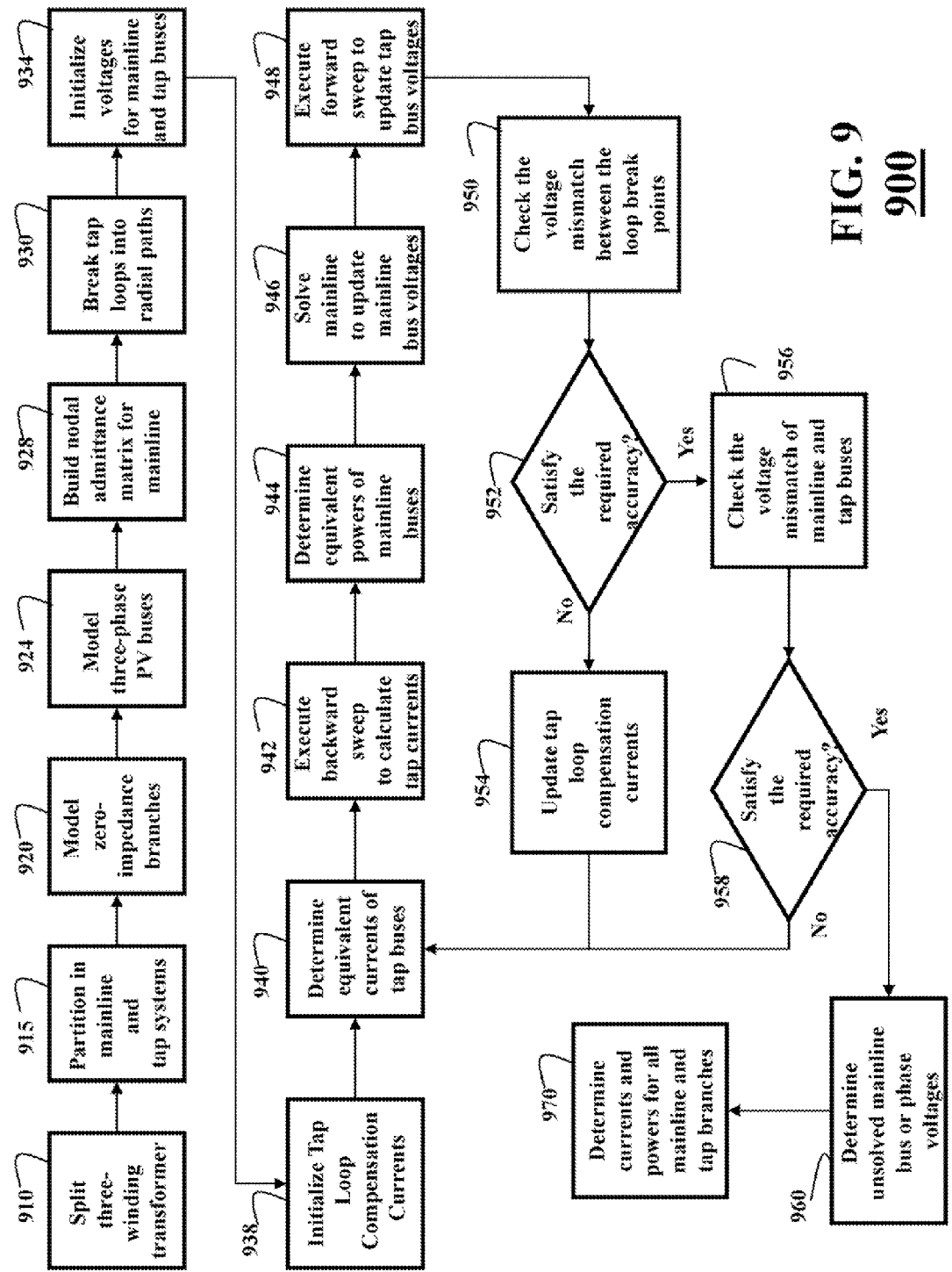
FIG. 9 is a block diagram of a hybrid three-phase power flow method for analyzing a model of an ungrounded power distribution system according to some embodiments of the invention.

FIG. 9 shows a block diagram of a method 900 for analyzing a model of an ungrounded power distribution system according to one embodiment of the invention. Various embodiments of invention use at least part of the steps of the method 900.

In step 910, three winding transformers are converted into three two-winding transformers to be modeled as shown in FIG. 4. After the conversion, the topology model of the system only contains two-terminal paths.

In step 915, the topology of the power distribution system is traced from the swing bus, and partition the system into mainline system and tap systems. The mainline system is constructed from all available paths between the swing bus and PV buses as shown in FIG. 3. The mainline system is a meshed system, if there is multiple paths between any pair of swing bus and PV bus existing. A tap system is constructed from one mainline bus and all downstream laterals connected with the bus. Depended on the distance from the bus to the mainline bus, tap systems can be divided into several layers as shown in FIG. 3, and the farther from the root bus, the higher the layer number is.

In step 920, the slave bus of a zero-impedance branch in the mainline system are removed and the zero-impedance branch and its adjacent impedance branch are replaced with a new branch between the master bus of zero-impedance branch and one of adjacent branch buses as shown in FIG. 7. The nodal admittance of new branch is determined based on the nodal admittance matrix of adjacent branch and voltage and current amplifying factor matrices of zero-impedance branch. The load at the slave bus is modeled as an equivalent load at the master bus. For ungrounded systems, the line-to-line voltages based amplifying factor matrices are converted to phase-to-ground based ones.

In step 924, the method determines the nodal admittance matrix of impedance branch connected with three phase PV buses with balanced voltages by replacing the three-phase PV bus with an equivalent single-phase PV bus model as shown in FIG. 8.

In step 928, the method constructs the nodal admittance matrix for the mainline system based on the nodal admittance matrix for each impedance branch including the new branches or branch model constructed in step 920 and step 924.

In step 930, the method breaks the loops in tap systems into radial paths, such that the configuration of the tap systems is solely radial, as shown in FIG. 5. In step 934, the voltage of each mainline or tap bus are initialized based on the voltage of swing bus and the aggregated voltage amplifying factor matrix introduced by the transformers and regulators on the shortest path from the swing bus to the study bus.

In step 938, the loop compensation currents are initialized based on the equivalent load currents for the loop, and the impedance matrices of two radial paths for the loop. In step 940, the method determines the equivalent current injections for each tap bus. The bus currents are contributed from connected loads, shunt capacitors, adjacent line charging, and loop compensation currents if the bus is one of loop break points. As shown in FIG. 6, line charging is added into terminal buses as equivalent line injections, such that the line model can be simplified as pure series impedance.

In step 942, for each tap system, the method executes a backward sweep to sum up the currents for each bus and branch from the farthest buses and ending at the root which is one of mainline buses. For ungrounded transformers or regulators, the line-to-line voltages based admittance or amplifying factor matrices are used. In step 944, the equivalent bus currents of mainlines are determined by adding downstream currents from tap system fed by the bus with the equivalent currents from loads at the bus, and then those values are converted into equivalent power injections.

In step 946, the method solves the power flow equations of the mainline system using, e.g., Newton method with constant Jacobian matrix. The sparse LU decomposition is used when the admittance matrix is symmetrical, and sparse Cholesky decomposition is used when the matrix is unsymmetrical. In this step, active and reactive power mismatch equations are solved iteratively until the required accuracy is reached.

In step 948, for each tap system, the method executes a forward sweep, calculates the voltages for each bus starting from the mainline bus at the first layer, and ending at the buses at the farthest layers. For ungrounded transformers or regulators, the line-to-line voltages based admittance or amplifying factor matrices are used to determine the line-to-line voltages, and then converted those voltages into phase-to-ground based ones.

In step 950, the maximum voltage difference between breakpoints for each loop is determined. In step 952, the required accuracy is tested, and execution proceeds to step 956, if the mismatches are less than given maximum tolerance, or, otherwise, to step 954. In step 954, the method adjusts the compensation currents for tap loops based on the voltage difference determined in step 950 and loop impedance matrices.

In step 956, the method determined the voltage mismatches for all mainline and tap buses between current iteration and last iteration. In step 958, if the mismatches are less than given maximum tolerance, a converged solution is obtained, and then the method proceeds to step 960. Otherwise, the method proceeds to step 940 to execute next iteration.

In step 960, the method determines the voltages for unsolved slave buses of zero-impedance branches, and unsolved phases for PV buses with balanced three-phase voltages. In step 970, the method determines the currents and powers for each branch in the mainline system and tap systems based the full set of voltages for the system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for a three phase power flow analysis of an ungrounded power distribution system, comprising a step:
   partitioning a topology of the power distribution system into a mainline system and a set of tap systems, wherein the mainline system is formed by mainline buses connecting a swing bus and a set of constant active power and voltage magnitude(PV) buses, wherein the tap system is formed by one or many tap buses, such that a root bus of each tap system corresponds to a mainline bus; and iteratively performing two voltage determining steps until voltage mismatches for all mainline and tap buses are less than a maximum tolerance;
   determining voltages of the mainline buses based on a function of a total load of each tap system; and determining voltages of tap buses based on a voltage of the corresponding root bus of the mainline and load of each tap bus, wherein steps of the method are performed by a processor.

2. The method of claim 1, further comprising:
initializing the voltages of the mainline and the tap buses based on a voltage of the swing bus and the topology of power distribution system;
determining the voltages of each bus of the distribution system recursively until a convergence criteria is satisfied, wherein each iteration includes
updating the voltages of mainline buses based on a total tap load of each tap system;
updating the voltages of tap buses based on the voltage of the corresponding root bus of the mainline; and
updating the total tap load based the voltages of the tap buses of the corresponding tap systems.

3. The method of claim 2, further comprising:
determining a nodal admittance matrix for an impedance branch connected to a three phase PV bus based on a model of a single phase bus, wherein a phase of the single phase bus corresponds to a sum of three phases of the PV bus, and wherein the updating the voltages of mainline buses is based on the nodal admittance matrix.

4. The method of claim 3, further comprising:
determining the voltages for three phases of the PV bus based on the voltage of the PV bus determined for the model of the single phase bus.

5. The method of claim 2, wherein the initializing comprises:
initializing the voltages based on amplifier factors of transformers and regulators along paths connecting each bus with the swing bus.

6. The method of claim 2, wherein the each iteration comprises:
determining the total load of each tap system based on a backward sweep to produce a set of current total loads;
updating the voltages of the mainline buses based on the set of current total loads and the admittance matrices of the mainline buses to produce the current voltages of the mainline buses; and
updating the voltages of the tap buses based on the current voltages of the mainline buses using a forward sweep.

7. The method of claim 6, further comprising:
transforming a loop of the topology of the tap system formed by a subset of tap buses into radial paths, wherein the each iteration further comprises:
testing a difference of voltages between the radial paths; and
adjusting the load allocation between the radial paths based on the difference of voltages and an admittance matrix of loops.

8. The method of claim 6, further comprising:
determining the convergence criteria as a maximum voltage update during a current iteration; and
comparing the convergence criteria with a threshold to determine a convergence of the iterations.

9. The method of claim 1, further comprising:
merging a zero-impedance mainline branch and adjacent impedance mainline branches into new impedance branches and set their nodal admittance matrices based on the admittance matrix of the adjacent branches and the amplifying factor matrices of the zero-impedance branch.

10. The method of claim 9, further comprising:
determining the voltage of the mainline bus with the zero-impedance branch based on the voltage of the adjacent mainline bus and the amplifying factor matrix of the zero-impedance branch.

11. The method of claim 9, wherein the power distribution system is ungrounded, further comprising:
determining the amplifying factor matrix by converting an amplifying factor for zero-impedance branch representing line-to-line voltages to an amplifying factor representing line-to-ground voltages.

12. The method of claim 1, wherein the partitioning further comprises:
updating the topology by representing a set of three-winding transformers as a set of two-winding transformers.

13. The method of claim 1, further comprising:
transforming a loop of the topology of the tap system formed by a subset of tap buses into radial paths.

14. The method of claim 13, wherein the transforming further comprises:
splitting a tap bus into two tap buses to break the loop; and
splitting a current of the tap bus into two corresponding currents.

15. The method of claim 1, further comprising:
determining a current and a power for each branch in the power distribution system based on the voltages of the buses.

16. A system for a three phase power flow analysis of an ungrounded power distribution system, comprising:
a processor for partitioning a topology of the power distribution system into a mainline system and a set of tap systems, and for iteratively determining voltages of mainline buses based on a function of a total load of each tap system and determining voltages of tap buses based on a voltage of the corresponding root bus of the mainline and load of each tap bus until voltage mismatches for all mainline and tap buses are less than a maximum tolerance.

17. The system of claim 16, further comprising:
a memory for storing the topology of the power distribution system.

* * * * *